Nov. 20, 1923.

E. RÜEGGER

REFRIGERATING MACHINE

Filed June 17, 1921

1,474,851

Inventor:
Eduard Rüegger
By [signature]
Atty.

Patented Nov. 20, 1923.

1,474,851

UNITED STATES PATENT OFFICE.

EDUARD RÜEGGER, OF ZURICH, SWITZERLAND.

REFRIGERATING MACHINE.

Application filed June 17, 1921. Serial No. 478,412.

*To all whom it may concern:*

Be it known that I, EDUARD RÜEGGER, a citizen of the Republic of Switzerland, residing at Zurich, Switzerland, have invented certain new and useful Improvements in Refrigerating Machines; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

Devices enabling the driving motor of refrigerating machines to be switched off or on when the supply of cooling water in said machines fails or is re-established, are already known; likewise contrivances exist for switching on or off the driving motor when the temperature in the cooling chamber becomes too high or too low.

This invention has for its object a device for regulating and ensuring the working of a refrigerating machine which is equipped with a condenser cooled by running water, and driven by a motor. According to this invention, a controlling device of the driving motor is acted upon, temporarily at least, by one contrivance depending on the cooling effect and by another contrivance depending on the quantity of cooling water passing through the condenser.

The device may be so constructed as to enable the contrivance depending on the cooling effect, to act upon the quantity of water which operates the other contrivance, and to enable the latter to act upon the controlling device. The contrivance acted upon by the quantity of water may comprise a tilter tipping over into one or the other of two end positions, according as more or less water is flowing through said tilter.

The accompanying drawing shows by way of example an embodiment of the object of the invention.

Figure 1:
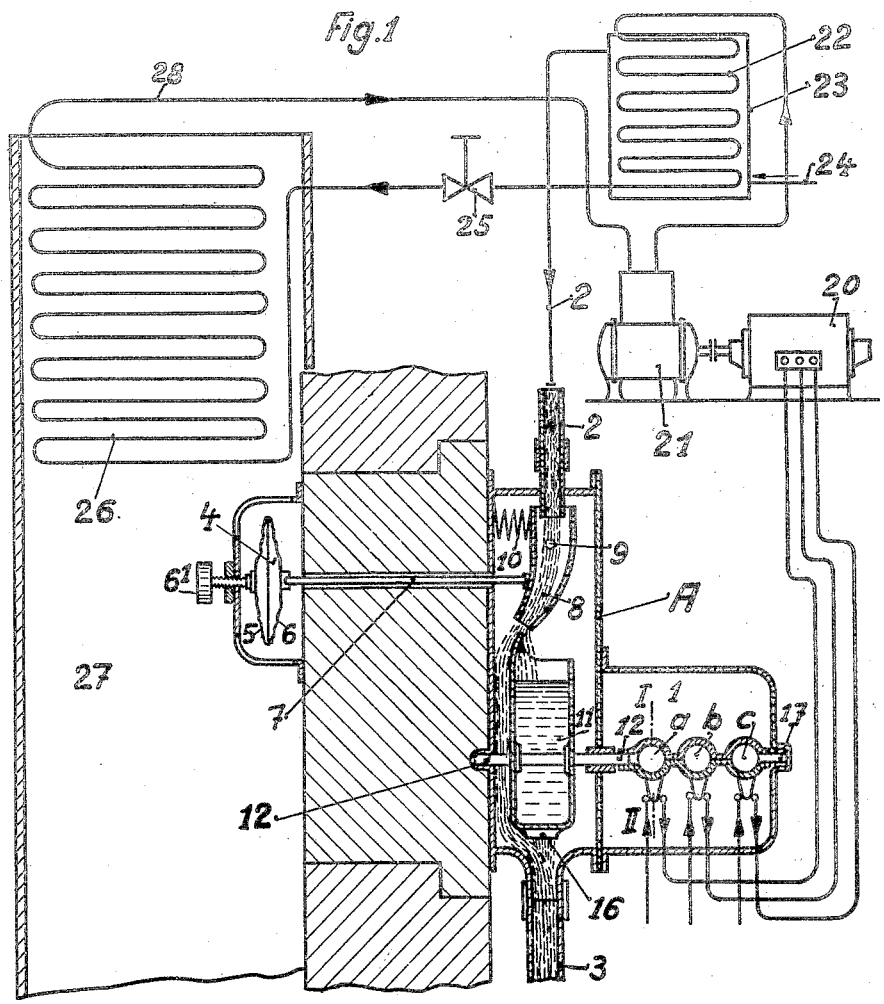
Fig. 1 shows diagrammatically a refrigerating machine, wherein the compressor of the cooling agent is driven by a three-phase motor, several parts of the machine being drawn, for the sake of clearness, on a much larger scale than the other parts.

In Fig. 1 an electromotor 20 drives a centrifugal compressor 21 for compressing the cooling agent, conveyed by said compressor 21 into a liquefier 22 within a tank 23, cooling water being supplied to said tank through a pipe 24. Said cooling water is discharged through a pipe 2 which forms at the same time the supply pipe 2 (drawn on a larger scale) of the cooling water for a device "A" regulating and ensuring the working of the plant. This device is provided with an electric switch 1 for the electromotor 20. The cooling agent passes from the liquefier 22 through a throttling valve 25 into an evaporator 26 placed in the chamber 27 to be cooled. The cooling agent is conveyed from the evaporator 26 back into the centrifugal compressor 21 through a pipe 28. The cooling water entering the regulating device A is discharged therefrom through pipe 3. A device 4 adapted to be acted upon by the temperature in the chamber 27 is formed in this case for instance by a diaphragm casing filled with a medium. The medium within the diaphragm casing 4 is for instance a gas in saturated condition and a certain quantity of a liquid, so that a slight change of temperature brought about in the chamber 27 causes a relatively considerable change of pressure in the diaphragm casing the distance of the centers of the two diaphragm walls 5 and 6 being altered thereby. The diaphragm wall 5 being secured in place at its center by the screw $6^1$, the opposite diaphragm wall 6 shifts the pin 7 to the right, when the cooling effect decreases, that is to say when the temperature in the chamber 27 rises, said pin acting upon a nozzle 8. This nozzle is pivoted on a fulcrum 9 and is constantly pressed against the pin 7 by a spring 10. The cooling water coming from the tank 23 of the liquefier 22, is deviated to the left upon its entering the device A at 2, by the nozzle 8. According to the extent of such deviation, a smaller or greater or even the whole of the quantity of water entering at 2 passes into the tilter 11 or all of it passes by this tilter. The water flowing off at the left of this tilter, is led away through the discharge pipe 3.

Figure 2:
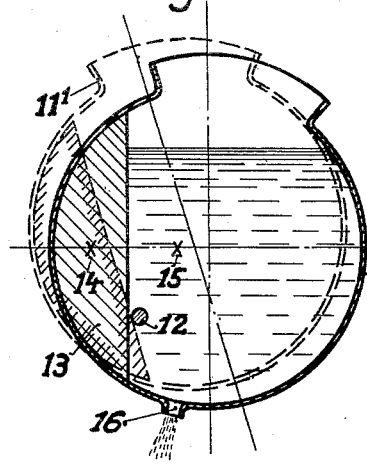
Figs. 2, 3 and 4 illustrate details of Fig. 1 on a particularly large scale.

Fig. 2 shows the tilter 11 by itself in a section vertical to the axis of rotation, and drawn on an enlarged scale in comparison with Fig. 1. It consists of a substantially hollow circular body adapted to be rocked about an axis of rotation 12. The portion of the hollow body which is, according to Fig. 2, to the left of the vertical line drawn through the axis of rotation 12, is weighted with lead or some other heavy body 13, the portion of the tilter to the left of the axis of rotation 12 thus being heavier than the portion to the right of the axis 12 as long as there is less than a certain quantity of water in the tilter. The tilter then occupies the position $11^1$ drawn in dotted lines. Now if water flows into the tilter from above, that is to say from the nozzle 8, the weight of those parts of the tilter to the right of the axis of rotation 12 together with the water will finally become larger than the weight of the parts to the left, and the tilter will then take up the position 11 drawn in Fig. 2 in full lines. When the tilter is empty, the center of gravity thereof is for instance at 14, whereas it is at 15, that is to say to the right of the axis of rotation 12 when the tilter is filled with water as shown. The fact that the center of rotation 12 is below the center of gravity of the tilter 11 both in its filled and empty condition makes the tilter quick acting, and necessarily so for the purpose of directly operating the switch controlling the motor, and not some auxiliary power device for operating the switch. Opposite to its inlet opening the tilter is provided with an outlet opening or vent 16, just enabling the smallest admissible quantity of water to flow off at a certain water level in the tilter. Should the passage of water through the tilter cease or diminish, either owing to an interruption in the water supply or owing to deviation by means of the nozzle 8 (in consequence of a corresponding displacement of the pin 7 by the diaphragm casing 4), then the water level in the tilter 11 sinks, the center of gravity shifts from 15 towards 14 and at a certain moment the tilter tips over into the position 11. The center of gravity being disposed at 14 or 15 above the axis of rotation 12, the tilter does not change over slowly, but suddenly, which is of course advantageous to the electric switching. By tipping over from the position 11 drawn in solid lines into the dotted position $11^1$, the tilter operates the electric switch 1 (Fig. 1) in such a way that the current is interrupted and thus the electromotor 20 serving to drive the centrifugal compressor 21 is stopped.

Figure 3:
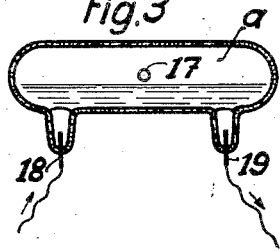
Figure 4:
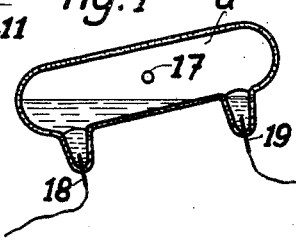

Figs. 3 and 4 serve as an explanation of the switch employed in the example dealt with for the three-phase motor forming the driving motor of the refrigerating machine. Said figures are sections through the switch on lines I—II in Fig. 1, for the two end positions of said switch, seen from the left and drawn on an enlarged scale. The switch carries three hollow glass bodies $a$, $b$ and $c$, each of which is partly filled with mercury and for the rest evacuated or filled with nitrogen, all three bodies being pivotable about an axis 17. According to the position of these glass bodies, the mercury contained therein leads the electric current from one contact 18 to the other contact 19 (Fig. 3) or it interrupts the current (Fig. 4). The contacts are somewhat differently drawn in Fig. 1 as compared with Figs. 3 and 4, in order to make the matter clearer. The axis of rotation 17 is the continuation of the axis 12 of the tilter.

Should the supply of cooling water cease, the temperature in the cooling chamber 27 however be high, the water will discharge from the tilter through the opening 16, thereby causing the motor to be switched off. Should the quantity of water again flow, the motor is switched in again. Should the temperature in the cooling chamber 27 drop too much, the nozzle 8 acted upon by the spring 10 and the diaphragm casing 4, will lead the water past the tilter 11 to its left (Fig. 1), thereby also cause the motor to be cut off. Should the temperature rise again to a certain degree, the motor is switched in again. Thus, this device A has the advantage of acting simultaneously as a safety and a regulating device. With the aid of this device the cooling temperature is kept within certain limits.

The form of the switch in the example shown enables also two- and three-phase motors to be switched in and off.

The range of temperatures within which the diaphragm casing 4 acts upon the nozzle 8 and thus upon the switch, may be shifted ad libitum by the adjustment of screw $6^1$.

Figure 5:
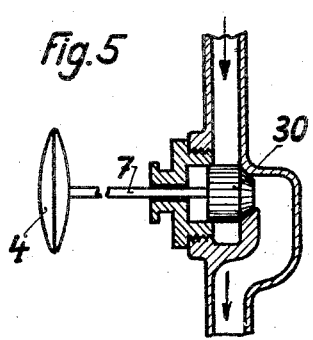
Fig. 5 shows a modified form of a detail.

Instead of a nozzle 8 a valve 30 may be used for regulating or even stopping the running of the water, as shown in Fig. 5.

In both Fig. 1 and Fig. 5 it will be noted that the devices 4, 7, are actuated by changes of temperature, and that both devices directly control the quantity of water for operating the motor switch.

The construction is much simplified, eliminating all auxiliary devices, servo-motors, electric mechanisms and the like that decrease the efficiency, increase the cost of installation and are sources of trouble during operation.

I claim:

1. In a refrigerating machine having an evaporator, a liquefier for refrigerant communicating with the evaporator, a compressor for the refrigerant communicating with the evaporator and forcing the compressed refrigerant into the liquefier, means to supply cooling water to the liquefier, and an electric motor for driving the compressor; in combination with an electric switch for the motor, means arranged to be influenced by the cooling water discharged from the liquefier to directly operate said switch, and means operated by the cooling temperature produced by the evaporator to directly control the supply of water to said switch-operating means.

2. In a refrigerating machine, a compressor, a motor driving the compressor, a liquefier supplied by said compressor, an evaporator leading from the liquefier to the compressor, means supplying the liquefier with running cooling water, an eccentrically loaded, eccentrically pivoted and vented tilter arranged to be supplied with water discharged from the liquefier, an electric switch for the motor directly operated by the tilter, and means operated by the cooling temperature produced by the evaporator to directly control the supply of water to said switch operating means.

In testimony that I claim the foregoing as my invention, I have signed my name.

EDUARD RÜEGGER.